Dec. 13, 1960 J. S. COURTNEY-PRATT ET AL 2,963,911
PIEZORESISTIVE ACCELEROMETER
Filed Feb. 18, 1959 2 Sheets-Sheet 1

INVENTORS: J. S. COURTNEY-PRATT
W. P. MASON

BY H. O. Wright
ATTORNEY

Dec. 13, 1960   J. S. COURTNEY-PRATT ET AL   2,963,911
PIEZORESISTIVE ACCELEROMETER
Filed Feb. 18, 1959                                    2 Sheets-Sheet 2

INVENTORS: J. S. COURTNEY-PRATT
W. P. MASON
BY H. O. Wright
ATTORNEY

United States Patent Office 2,963,911
Patented Dec. 13, 1960

2,963,911
PIEZORESISTIVE ACCELEROMETER

Jeofry S. Courtney-Pratt, Springfield, and Warren P. Mason, West Orange, N.J., assignors to Bell Telephone Laboratories, Incorporated, New York, N.Y., a corporation of New York Filed Feb. 18, 1959, Ser. No. 794,173

12 Claims. (Cl. 73—517)

This invention relates to accelerometers. More particularly, it relates to a type of accelerometer employing elements of piezoresistive material.

A number of differing types of accelerometers providing indications of acceleration (or deceleration, i.e., the inverse of acceleration) with respect to a single direction or a plurality of directions are known in the art. However, in general, prior art accelerometers each require a plurality of indicating elements as well as mounting arrangements and associated circuits of sufficient complexity that they are difficult to manufacture and adjust and also difficult to maintain in adjustment. Also, the sensitivity of the elements employed in prior art accelerometers is relatively low.

It is accordingly a principal object of the present invention to overcome the above indicated and other disadvantages of prior art accelerometers and to greatly increase the sensitivity of accelerometers.

In accordance with the present invention a large increase in sensitivity and a high degree of simplification are achieved by the use of a single unitary indicating element comprising a central mass with one pair or with a plurality of pairs of oppositely disposed projecting legs cut from a single crystal of a piezoresistive material such, for example, as germanium or silicon. The longitudinal axes of the projecting pair of legs are oriented in particular manners with respect to the crystallographic axes of the crystal from which the element is cut to render the electrical resistance of each leg more sensitive to tension and/or compression applied along the common longitudinal axis of each pair of legs.

The outer ends of all the legs are supported by a rigid frame member of nonconductive material. The frame in turn is firmly mounted on the object or vehicle, the acceleration of which is to be measured. Alternatively, the frame may obviously be dispensed with and the ends of the legs can be fastened directly to a rigid portion of the vehicle in such manner that the central mass and the legs except for their ends are not constrained in any manner by the vehicle.

Each oppositely disposed pair of legs is connected in a balanced electrical circuit which becomes unbalanced when the frame member is accelerated or decelerated in a direction parallel to or having an appreciable component parallel to the common longitudinal axis of the pair of legs. When the velocity of the object or vehicle is changing, the inertia effect of the central mass subjects one leg to compressive stress and the other to tension thus increasing the resistance of one leg and decreasing that of the other, as will be described in more detail hereinunder.

Each circuit includes an indicator responsive to the degree of unbalance of the circuit to provide an indication proportional to the acceleration or deceleration in the direction of the common longitudinal axis of its associated pair of legs.

A further feature of the invention is the provision of "feedback" between the circuits of orthogonally related pairs of legs to compensate for the tendency of a circuit to produce a small or residual indication in response to acceleration or deceleration at right angles to the longitudinal axis of its associated pair of legs.

A still further feature is the provision of circuits which will readily distinguish the direction of acceleration or deceleration with respect to the common longitudinal axis of a pair of legs of the devices of the invention.

The above and other objects, features and advantages of the invention will become more readily apparent from a perusal of the following detailed description of illustrative embodiments of the invention.

Figure 8:
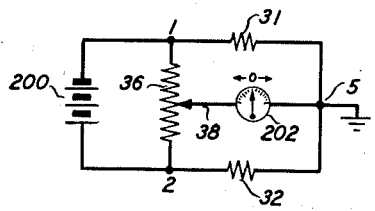
Figure 9:
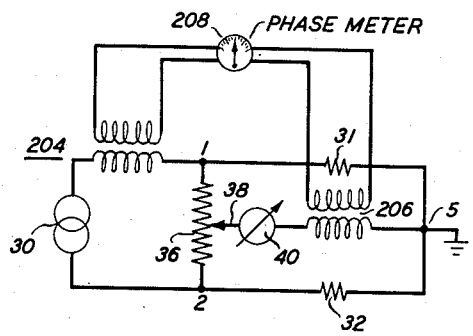

Fig. 8 illustrates in electrical schematic diagram form a first simple circuit of the invention for indicating the direction of acceleration or deceleration with respect to a predetermined reference direction; and Fig. 9 illustrates in electrical schematic diagram form a second simple circuit of the invention for indicating the direction of acceleration or deceleration with respect to a predetermined reference direction.

For the purposes of the present application it is to be understood that the well known and extensively used Miller crystallographic indices are being employed in designating the orientations of the arms of the piezoresistive elements with respect to the crystallographic axes of the single crystals from which they are cut.

As is well known to those skilled in the art, the piezoresistive materials, such as silicon and germanium, have the cubic type of crystal structure and consequently, a number of the alignments required for the structures to be used in devices of the present invention may be referred to planes defined by any pair of the three cubic axes, i.e., a number of the elements can be cut in any one of three or even more appropriately related planes with respect to the crystallographic axes of the single crystal.

Figure 1:
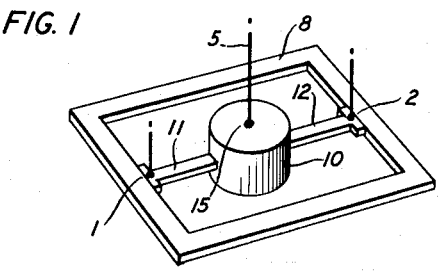
Fig. 1 illustrates diagrammatically a simple form of piezoresistive element and supporting frame suitable for use in an accelerometer circuit of the invention.

In more detail in Fig. 1, a piezoresistive element comprising an enlarged central portion 10 with oppositely disposed but otherwise identical legs 11 and 12 extending along a common longitudinal axis is shown. Central portion 10 is illustrated as being of circular cylindrical shape but alternatively could be a cube or of any other shape having symmetry about the common longitudinal axis of legs 11 and 12. The piezoresistive element is supported in a mechanically rigid, electrically nonconducting frame 8, the outer ends of legs 11 and 12 being preferably slightly enlarged to afford greater mechanical strength and being firmly attached mechanically to frame 8, as, for example, by a strongly adhesive material. When the device is at rest frame 8 should exert neither tension nor compression on the ends of legs 11 and 12. The central portion 10 should be sufficiently large to have appreciable mass and the cross-sectional area of the legs 11 and 12 should be made as small as practicable in view of the mechanical forces to which they will be subjected in service.

Conductive electrical leads 1, 2 and 5 are connected to the points indicated in Fig. 1 of the element of piezo-resistive material, i.e., to the ends of arms 11 and 12 and to the central mass 10, respectively, in accordance with any of the methods well known to those skilled in the art for making electrical connections to such elements without changing the conductivity type of the material at or near the points to which connections are made. Alternatively, these leads can be connected by thermo-compression bonding as taught, for example, in the copending application of O. L. Anderson and H. Christensen, Serial No. 619,639, filed October 31, 1956, or by twist-compression bonding as taught in the copending application of O. L. Anderson, P. Andreatch and H. Christensen, Serial No. 647,886, filed March 22, 1957, both of which applications are assigned to applicants' assignee.

Whatever method of attaching the electrical leads is employed, it should, as mentioned above, be of a type which does not introduce any change in the conductivity type of the piezoresistive material.

Piezoresistive element 10 with its oppositely disposed legs 11 and 12, is cut from a single crystal of the piezoresistive material to be used, the preferred materials being either silicon or germanium, which materials can be of either positive (p) or negative (n) conductivity type, the conductivity type being the same throughout the entire volume of the element.

If the piezoresistive element is made from either p-type or n-type germanium or from p-type silicon, it should preferably be cut from the single crystal with the common longitudinal axis of legs 11 and 12 parallel to the [111] direction with respect to the crystallographic axes of the crystal in order to provide an element of maximum sensitivity for the purposes of the present invention. Alternatively, if cut with the common longitudinal axes of arms 11 and 12 parallel to any "110" direction, i.e. [110], [1̄10], [1̄1̄0] and [11̄0], its sensitivity for the purposes of the present invention will be approximately three-quarters of the sensitivity which would be obtained for the [111] orientation described above. Directions approximating those above specified to within plus or minus 15 degrees will still produce resistance changes of entirely usable magnitude but the sensitivity will be decreased slowly at first and then more rapidly as the angular deviation from the ideal orientation is increased in any specific case.

Correspondingly, for n-type silicon the device should be cut from the single crystal with the common longitudinal axis of arms 11 and 12 parallel to any one of the three crystal axes.

Figure 2A:
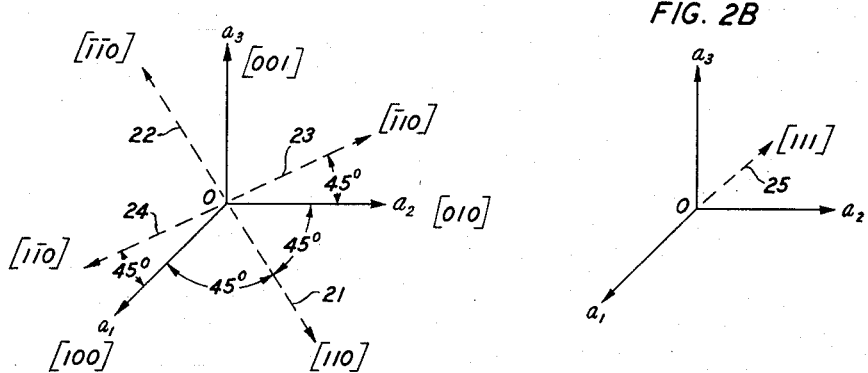
Figs. 2A and 2B illustrate preferred orientations for the axes of the legs of piezoresistive elements of the invention with respect to the crystallographic axes of the single crystal from which piezoresistive elements are cut.
Figure 2B:
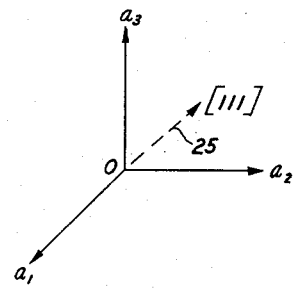

The crystal axes $a_1$, $a_2$ and $a_3$ of cubic crystals including germanium and silicon are orthogonally related as illustrated by solid line arrows $a_1$, $a_2$ and $a_3$ extending from the origin point O in Figs. 2A and 2B.

In Fig. 2A, the four "110" directions listed above, in the plane defined by axes $a_1$ and $a_2$, are indicated by the broken line arrows 21, 22, 23 and 24, respectively. All of the broken line arrows 21 through 24, inclusive, lie in the plane which contains the axes $a_1$ and $a_2$ and make equal angles (45 degrees) with each of the axes $a_1$ and $a_2$ (or their "negative" extensions in the three quadrants not facing forward as shown in Fig. 2A).

A mentioned hereinabove, in crystals of materials such as germanium and silicon which are of the cubic type, it is immaterial which two of the three axes $a_1$, $a_2$ and $a_3$ are selected to define the plane in which the four "110" directions 21 through 24, inclusive, are to be located.

In Fig. 2B the [111] direction is illustrated by the broken line arrow 25 which makes equal angles with all three of the axes $a_1$, $a_2$ and $a_3$.

Figure 3:
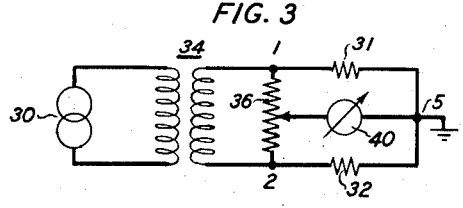
Fig. 3 illustrates in electrical schematic diagram form a simple circuit of the invention.

In Fig. 3 an electrical circuit for use with the structure of Fig. 1 is illustrated and schematic diagram form. Resistors 31 and 32 represent the electrical resistances of arms 11 and 12, respectively, of Fig. 1. Terminals 1, 2 and 5 of Fig. 3 correspond respectively to the like designated terminals of Fig. 1. To complete a four-armed bridge of the type commonly known as a Wheatstone bridge, a potentiometer 36 is connected between terminals 1 and 2 as shown in Fig. 3, the resistive element of potentiometer 36 preferably having a value substantially equal to the sum of the resistances 31 and 32 when the device of Fig. 1 including, of course, its supporting frame 8, is at rest. Resistances 31 and 32 are preferably substantially identical (i.e. the legs 11 and 12 of Fig. 1 are preferably made substantially identical). Any small difference between the resistances of legs 11 and 12, i.e. between resistances 31 and 32, can, of course, be compensated for by careful adjustment of the position of the movable or adjustable contacting member 38 of potentiometer 36 to balance the bridge. The bridge, of course, comprises resistors 31 and 32 and the upper and lower portions of potentiometer 36 as divided by the position of the adjustable contacting member 38.

Energy from alternating current source 30 is supplied through transformer 34 to terminals 1 and 2, as shown in Fig. 3. The terminals 1 and 2, obviously, comprise one of the two diagonally opposed terminals of the bridge circuit described in detail above. The second diagonally opposed pair of terminals of the bridge, i.e. adjustable contacting member 38 of potentiometer 36 and terminal 5, have an indicating means such, for example, as a meter 40 connected between them.

The frame 8 is rigidly and firmly attached to the vehicle whose acceleration is to be determined so that when the vehicle is accelerated in a direction parallel to (or having an appreciable component parallel to) the common longitudinal axis of legs 11 and 12, the inertia of the central mass 10 will cause one of the legs to be subjected to tension and the other to compression thus increasing the resistance of one leg and decreasing the resistance of the other.

If the bridge is balanced when the device of Fig. 1 is at rest (or moving at a uniform velocity), meter 40 will read zero. During any period in which the velocity of the device in a direction other than at right angles to the direction of the common longitudinal axis of legs 11 and 12 (Fig. 1) is changing, the electrical resistance of one leg will be increased and that of the other leg will be decreased, as above mentioned, thus unbalancing the bridge circuit and producing a reading on meter 40 the magnitude of which will be proportional to the degree of unbalance which in turn will be proportional to the change in velocity (i.e. the acceleration or deceleration) of the vehicle to which supporting frame 8 of the device of Fig. 1 is fastened.

Figure 4:
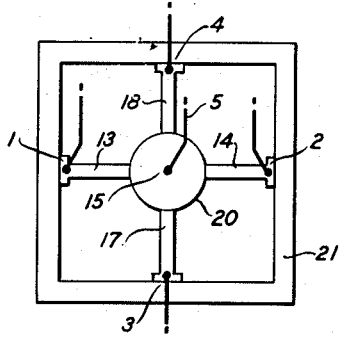
Fig. 4 illustrates diagrammatically a form of piezoresistive element and supporting frame suitable for use in a more complex indicating accelerometer circuit of the invention.
Figure 5:
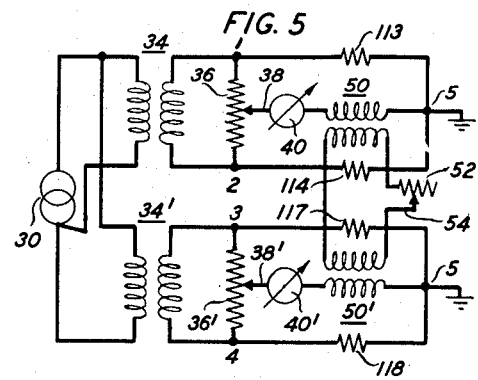
Fig. 5 illustrates in electrical schematic diagram form a more complex indicating accelerometer circuit of the invention.
Figure 6:
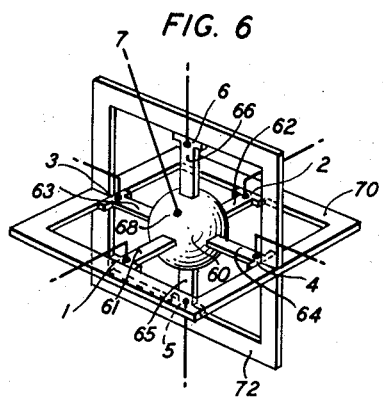
Fig. 6 illustrates diagrammatically a form of piezoresistive element and supporting frame suitable for use in an omnidirectional indicating accelerometer circuit of the invention.

Theoretically, a change in velocity at right angles to the common longitudinal axis of legs 11 and 12 should affect the resistances of the two legs identically and thus produce no unbalance of the bridge circuit. In practice, however, an exact balance is difficult to realize and an indication of small magnitude will usually be obtained. Where, as will be described in detail in connection with more complex devices such, for example, as are illustrated by Figs. 4 and 6, two or three orthogonally related pairs of legs are employed, mutual compensation for the small magnitude indications of any of the several pairs which are at right angles to the direction of the acceleration can be realized by "feedback" circuits interconnecting the indicating circuits. Alternatively, two or more circuits of the type illustrated in Fig. 3, their respective associated structures as illustrated in Fig. 1 being mounted orthogonally, could obviously include the mutual compensation feature.

Where it is necessary to obtain indications of the acceleration or deceleration of a vehicle at any angle within a plane, either two devices of the type illustrated by Fig. 1, connected in independent circuits of the type illustrated in Fig. 3, mounted with the common longitudinal axes of their respective pairs of legs at right angles to each other, can be employed or the more complex device illustrated in Fig. 4 connected in the more complex circuit illustrated in Fig. 5 can be used.

In Fig. 4, a structure comprising a central mass 20 and two pairs of oppositely disposed legs 13, 14 and 17, 18 is shown. Legs 13 and 14 have a common longitudinal axis as do also legs 17 and 18. This structure is cut from a single crystal of either germanium or silicon.

If cut from a single crystal of germanium of either n-type or p-type conductivity, legs 13, 14, 17 and 18 should be oriented with respect to the crystallographic axes in "110" directions. For example, legs 13 and 14 can be in the [110] and [1̄1̄0] directions, respectively, as illustrated in Fig. 2A and legs 17 and 18 can be in the [1̄10] and [11̄0] directions, respectively, as illustrated in Fig. 2A, or vice versa. As stated previously, any two of the three crystallographic axes $a_1$, $a_2$ and $a_3$ can be selected to define the plane in which the "110" directions are to be situated.

If cut from a single crystal of silicon of n-type conductivity, the common longitudinal axes of legs 13 and 14 should be parallel to any one of the three crystallographic axes $a_1$, $a_2$ or $a_3$ and the common longitudinal axis of legs 17 and 18 should be parallel to either one of the two remaining crystallographic axes.

If cut from a single crystal of silicon of p-type conductivity, then the alignment of legs 13, 14, 17 and 18 should be along "110" directions as described above for elements cut from a germanium crystal.

Frame 21 is of electrically nonconductive, rigid material and firmly secures the outer ends of all four legs 13, 14, 17 and 18. When at rest, frame 21 exerts neither tension nor compression on the legs. The legs may be secured to frame 21 in any convenient manner as, for example, by a strongly adhesive material. Electrical connections are made in any of the manners suggested above in connection with the device of Fig. 1. The electrical connection to the central mass 20 at point 15 is designated by terminal number 5 and the electrical connections to the outer ends of legs 13, 14, 17 and 18 are designated by terminal numbers 1, 2, 3 and 4, respectively, as shown in Fig. 4. Frame 21 is, of course, intended to be firmly and rigidly secured to the vehicle whose acceleration is to be determined. Alternatively, it can in effect be a rigid portion of the vehicle, supporting the ends of legs 13, 14, 17 and 18, only.

In Fig. 5 electrical circuits which may be associated with the device of Fig. 4 for determining the acceleration or deceleration of a vehicle to which frame 21 has been rigidly secured are shown.

In Fig. 5, a suitable source of alternating current 30 is connected to the input windings of two substantially identical transformers 34 and 34' connected in parallel as shown.

The output winding of transformer 34 is connected to terminals 1 and 2 of the device of Fig. 4 and the resistive unit 36 of a potentiometer, having an adjustable contacting arm 38, is also connected across terminals 1 and 2, as shown in Fig. 5.

Resistors 113 and 114 of Fig. 5 represent the electrical resistances of legs 13 and 14 of the device of Fig. 4, respectively. Terminal 5 represents the connection to the central mass 20 and is grounded. A circuit including a meter 40 and one winding of a transformer 50 connected in series is in turn connected between contacting arm 38 and terminal 5 as shown. The single terminal 5 is shown in two positions in the diagram of Fig. 5 to simplify the illustration of the circuits.

The output winding of transformer 34' is connected to a circuit identical to that described immediately above in connection with transformer 34 except that its connects to terminals 3 and 4 of the device of Fig. 4 and resistors 117 and 118 therefore represent the electrical resistances of legs 17 and 18 of the device of Fig. 4, respectively. Potentiometer 36', 38', meter 40' and transformer 50' are substantially identical to the unprimed correspondingly numbered elements of the upper right portion of the circuit of Fig. 5, as described hereinabove, and are interconnected in a corresponding manner. The second windings of transformers 50 and 50' are connected in series with a potentiometer including resistor 52 and adjustable contacting arm 54 by means of which "feedback" from each circuit to the other is adjusted to compensate for the small residual reading which may be obtained in either of the meters 40, 40' when the acceleration is at right angles to the common longitudinal axis of its associated pair of legs of the device of Fig. 4. Except for transformers 50, 50' and their interconnecting circuit, the circuit of Fig. 5, obviously, consists of two bridge circuits of the type illustrated in Fig. 3 and described in detail above. However, since the two circuits of Fig. 5 connect respectively to pairs of legs of the device of Fig. 4 which are orthogonally related, the indications of the two meters 40, 40' will indicate accelerations with respect to orthogonally related directions and therefore the direction and magnitude of the acceleration at any angle within the plane of the two pairs of legs can be determined from the readings of the two meters.

In Fig. 6 a still more complex arrangement of the invention is illustrated and comprises a central mass 60 having three pairs of orthogonally related legs 61, 62; 63, 64; and 65, 66, respectively, supported in a rigid frame of electrically nonconductive material comprising the members 70 and 72. Electrical connections are made to the outer ends of legs 61 through 66, inclusive, and designated by the terminal numbers 1 through 6, inclusive, respectively, as shown. An electrical connection to the central mass 60 at point 68 is designated by the number 7. The central mass 60 and legs 61 through 66, inclusive, are cut from a single crystal of silicon as a unitary element. The common longitudinal axis of each of the three pairs of legs should be parallel to one of the crystallographic axes $a_1$, $a_2$ and $a_3$ (as illustrated in Fig. 2A), respectively, of the single crystal from which the element is cut. The frame comprising the members 70, 72 should be rigidly attached to the vehicle whose acceleration or deceleration is to be determined.

Figure 7:
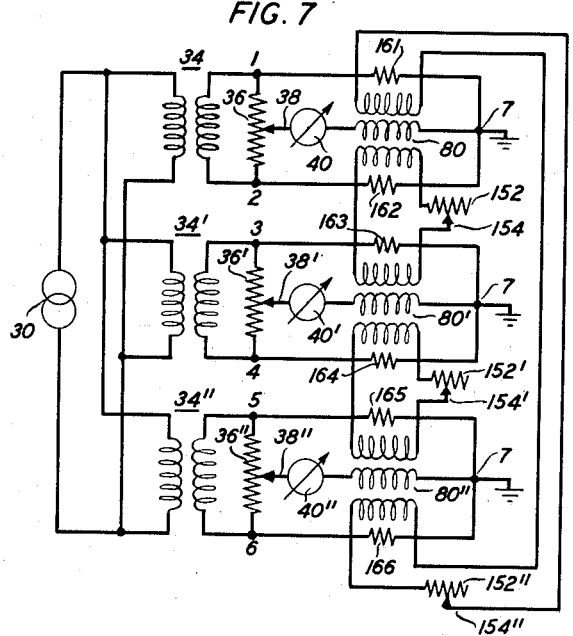
Fig. 7 illustrates in electrical schematic diagram form an omnidirectional indicating accelerometer circuit of the invention.

A form of electrical circuit suitable for use with the arrangement of Fig. 6 is illustrated in Fig. 7. A source of alternating current 30 is connected to the input windings of the three transformers 34, 34' and 34" connected in parallel. The three output windings of these transformers are connected to terminals 1, 2; 3, 4; and 5, 6, respectively, of the arrangement of Fig. 6. Resistors 161 through 166, inclusive, represent the resistances of legs 61 through 66, inclusive, respectively, of Fig. 6 and terminal 7 represented in three positions in the circuit of Fig. 7 to simplify the illustration of the circuit is, of course, one and the same terminal, i.e. terminal 7 of Fig. 6 connecting to the central mass 60.

Obviously, the diagram of Fig. 7 comprises three bridge circuits of the type illustrated and described in detail in connection with Fig. 3, except for the compensating transformers 80, 80' and 80" and their interconnecting circuits. Corresponding apparatus units in the three circuits have corresponding numbers but the numbers are primed in the second and double primed in the third of the three circuits, respectively, as shown in Fig. 7.

Compensating transformers 80, 80' and 80" each have three windings, one connected in series with meter 40, 40' or 40", respectively, and terminal 7, the other two being employed to cross connect the diagonal arm of the bridge with which the particular transformer is associated to the transformers in the corresponding diagonal arms of the other two of the bridge circuits, as shown. Potentiometers 152, 154; 152', 154' and 152", 154" permit adjustment of the degree of "feedback" between each bridge circuit and each of the other bridge circuits to compensate for the small residual reading which may be obtined in one of the meters 40, 40' or 40" when the acceleration is at right angles to the common longitudinal axis of its associated pair of legs of the device of Fig. 6.

Since the three circuits of Fig. 7 connect respectively to three pairs of orthogonally related pairs of legs of the arrangement of Fig. 6, the indications of the three meters 40, 40' and 40" of Fig. 7 will indicate acceleration of the vehicle to which frame 70, 72 is attached in any direction.

Obviously, substantially equivalent results could alternatively be obtained by employing three orthogonally oriented devices of Fig. 1 each with a circuit of Fig. 3 or by employing two orthogonally oriented devices of Fig. 4 each with a circuit of Fig. 5.

In Fig. 8 a further arrangement of the invention is illustrated in electrical schematic diagram form which will indicate, for example, the direction of the acceleration or deceleration with respect to the longitudinal axis of the associated pair of legs. The circuit of Fig. 8 represents an alternative to the circuit of Fig. 3 for use with the device illustrated in Fig. 1. The circuit of Fig. 8 differs from that of Fig. 3 in that a direct-current source 200 is substituted for the source 30 and its associated transformer 34 and a zero center meter 202 is substituted for the meter 40 of Fig. 3.

Since for opposite directions of acceleration parallel to the common longitudinal axis of arms 11 and 12 of Fig. 1 the effect upon the resistances 31 and 32 of arms 11 and 12, respectively, will be reversed (i.e. if for one direction resistance 31 increases and 32 decreases, for the other direction 31 will decrease and 32 will increase) the direction of the deflection of the zero center meter 202 in Fig. 8 will indicate in which direction along the common longitudinal axis of the arms 11 and 12 of Fig. 11 the vehicle to which frame 8 of Fig. 1 is attached is being accelerated or decelerated.

In Fig. 9 a second simple circuit for use with the structure of Fig. 1 is shown and is also similar to the circuit of Fig. 3 except for the introduction of transformers 204 and 206 and the associated phase meter 208. The phase meter 208 compares the phases of the energy furnished by source 30 and the energy flowing through the bridge diagonal in which meter 40 is included. As described for Fig. 3, meter 40 in Fig. 9 indicates the magnitude of the acceleration or deceleration. Phase meter 208 of Fig. 9 provides an indication of the direction with respect to the common longitudinal axis of the arms 11 and 12 of Fig. 1 of the acceleration or deceleration being imparted to frame 8 of Fig. 1.

Numerous and varied modifications and rearrangements of the illustrative embodiments of the invention described in detail above can be readily devised by those skilled in the art without departing from the spirit and scope of the principles of the present invention. For example, the mass of the central portion of any of the piezoresistive elements suitable for use in arrangements of the invention may obviously be increased by loading it with resin or lead or other suitable material symmetrically applied, and numerous variations of the shapes and proportions of the central portions and the pairs of legs may be readily devised by those skilled in the art all within the spirit and scope of the invention.

What is claimed is:

1. A structure for use in an accelerometer comprising a unitary member of piezoresistive material having a centrally located mass and a pair of oppositely disposed legs extending from the mass along a common longitudinal axis, the member having been cut from a single crystal of the piezoresistive material with the common longitudinal axis of the pair of legs oriented in a predetermined manner with respect to the crystallographic axes of the crystal such that the electrical resistances of the legs vary oppositely when one is placed under tension and the other is placed under compression, respectively, electrical connecting means attached to the mass and the outer ends of the two legs, respectively, and means for mechanically supporting the outer ends of the pair of legs.

2. A structure for use in an accelerometer comprising a unitary element cut from a single crystal of the class comprising germanium and silicon, the element comprising a central mass and a plurality of pairs of oppositely disposed legs extending from the central mass, each pair of legs having a common longitudinal axis, the common longitudinal axes of the plurality of pairs of legs being orthogonally related, the element being cut from the crystal with the common longitudinal axis of each pair of legs being oriented with respect to the crystallographic axes of the crystal in a predetermined manner such that the electrical resistances of the legs of the pair vary oppositely when one is placed under tension and the other under compression, respectively, electrical connecting means attached to the mass and the outer ends of all of the legs, respectively, and means for mechanically supporting the outer ends of all of the legs.

3. The structure of claim 1 in which the piezoresistive material is of the class comprising germanium of p-type conductivity, germanium of n-type conductivity and silicon of p-type conductivity, and the common longitudinal axis of the pair of legs is oriented in a direction parallel to the direction defined by a line extending from the point of intersection of the crystallographic axes and making equal angles with respect to all three of the crystallographic axes of the single crystal from which the piezoresistive element is cut.

4. The structure of claim 1 in which the piezoresistive material is of silicon of n-type conductivity and the common longitudinal axis of the pair of legs is oriented in a direction parallel to one of the crystallographic axes of the single crystal from which the piezoresistive element is cut.

5. The structure of claim 1 in which the piezoresistive material is of the class comprising germanium of p-type conductivity, germanium of n-type conductivity and silicon of p-type conductivity, and the common longitudinal axis of the pair of legs is oriented in one of the directions defined by a line in the plane of any two of the crystallographic axes and extending from the point of intersection of the axes to make equal angles with respect to the two crystallographic axes defining the plane of the single crystal from which the piezoresistive element is cut.

6. The structure of claim 2 in which the piezoresistive material is of the class comprising germanium of p-type conductivity, germanium of n-type conductivity and silicon of p-type conductivity, and the common longitudinal axis of each pair of oppositely disposed legs is oriented in one of the directions defined by a line in the plane of any two of the crystallographic axes and extending from the point of intersection of the axes to make equal angles with respect to the two crystallographic axes defining the plane of the single crystal from which the piezoresistive element is cut.

7. The structure of claim 2 in which the piezoresistive material is of silicon of n-type conductivity and the common longitudinal axis of each pair of oppositely disposed legs is oriented in a direction parallel to one of the crystallographic axes of the single crystal from which the piezoresistive element is cut.

8. A piezoresistive element of a material of the class comprising germanium and silicon, the element comprising a central mass and a pair of oppositely disposed legs extending from the mass along a common longitudinal axis, the element being cut from a single crystal of the material, the common longitudinal axis of the pair of legs being oriented in a predetermined manner with respect to the crystallographic axes of the crystal such that the electrical resistances of the legs vary oppositely when one is placed under tension and the other is placed under compression, and means for electrically connecting to the ends of the pair of legs and to the central mass, respectively.

9. An electrical circuit comprising a structure as defined in claim 1, a source of alternating current connected across the ends of the pair of legs of the structure, a ground connected to the central mass, a potentiometer, the resistive element of the potentiometer being connected in parallel with the source of alternating current across the pair of legs, and a meter interconnected between the adjustable contacting arm of the potentiometer and ground whereby a bridge circuit is established which can be balanced with the structure at rest and will become unbalanced when the structure is subjected to acceleration, the degree of unbalance being indicated by the magnitude of the meter reading.

10. An electrical circuit comprising a structure as defined in claim 2 and a circuit associated with each pair of legs comprising a ground connected to the central mass, means for supplying electrical energy to the ends of the legs, a potentiometer, the resistive element of the potentiometer being connected in parallel across the ends of the legs, and a meter interconnecting the adjustable contacting arm of the potentiometer and ground.

11. An electrical circuit as defined in claim 10 in which one winding of a transformer is included in each of the meter circuits of at least two pairs of legs and a second potentiometer is connected in series with second windings of the transformers whereby adjustable feedback can be provided between the meter circuits interconnected through the transformers.

12. A device for use in accelerometers comprising a unitary element of a piezoresistive material, the element comprising a centrally positioned mass and a plurality of pairs of oppositely positioned legs extending from the mass, each pair of legs having a common longitudinal axis, and means for connecting electrically to the central mass and to the outer end of each leg of the device.

References Cited in the file of this patent

UNITED STATES PATENTS

| | | |
|---|---|---|
| 2,045,403 | Nicholides | June 23, 1936 |
| 2,371,626 | Kecskemeti | Mar. 20, 1945 |
| 2,632,062 | Montgomery | Mar. 17, 1953 |
| 2,662,956 | Bareford | Dec. 15, 1953 |